US012245319B2

(12) United States Patent
Agiwal et al.

(10) Patent No.: US 12,245,319 B2
(45) Date of Patent: Mar. 4, 2025

(54) METHOD AND APPARATUS HANDLING SL DRX INACTIVITY TIMER IN WIRELESS COMMUNICATION SYSTEM

(71) Applicant: Samsung Electronics Co., Ltd., Suwon-si (KR)

(72) Inventors: Anil Agiwal, Suwon-si (KR); Hyunjeong Kang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 309 days.

(21) Appl. No.: 17/550,456

(22) Filed: Dec. 14, 2021

(65) Prior Publication Data

US 2022/0191965 A1 Jun. 16, 2022

(30) Foreign Application Priority Data

Dec. 15, 2020 (KR) ........................ 10-2020-0175273

(51) Int. Cl.
*H04W 76/28* (2018.01)
*H04L 1/00* (2006.01)
(Continued)

(52) U.S. Cl.
CPC ........... *H04W 76/28* (2018.02); *H04L 1/0025* (2013.01); *H04L 1/1812* (2013.01); *H04W 72/1263* (2013.01); *H04W 72/20* (2023.01)

(58) Field of Classification Search
CPC . H04W 76/28; H04W 72/1263; H04W 72/20; H04W 76/14; H04W 24/08;
(Continued)

(56) References Cited

U.S. PATENT DOCUMENTS 11,903,080 B2 * 2/2024 Jeong .................... H04W 72/20
11,903,081 B2 * 2/2024 Park ...................... H04W 72/02
(Continued)

FOREIGN PATENT DOCUMENTS

EP 3989646 A1 * 4/2022 ........ H04W 52/0216
WO 2018/037317 A1 3/2018
(Continued)

OTHER PUBLICATIONS

R1-2007897; LG Electronics; Discussion on physical layer design considering sidelink DRX operation; Oct. 26-Nov. 13, 2020.*
(Continued)

*Primary Examiner* — Jay P Patel
(74) *Attorney, Agent, or Firm* — Jefferson IP Law, LLP

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. A method performed by a first user equipment (UE) in a wireless communication system is provided. The method includes receiving, from a second UE, first sidelink control information (SCI) including scheduling information, receiving, from the second UE, second SCI based on the scheduling information, identifying whether the second SCI indicates a new transmission, and in case that the second SCI indicates the new transmission, starting a sidelink discontinuous reception (DRX) inactivity timer.

20 Claims, 7 Drawing Sheets

(51) Int. Cl.
*H04L 1/1812* (2023.01)
*H04W 72/1263* (2023.01)
*H04W 72/20* (2023.01)

(58) Field of Classification Search
CPC . H04W 52/0216; H04W 72/25; H04W 92/18; H04L 1/0025; H04L 1/1812; H04L 2001/0093; H04L 1/1848; Y02D 30/70
See application file for complete search history.

(56) References Cited

U.S. PATENT DOCUMENTS

| | | | |
|---|---|---|---|
| 2015/0365995 A1 | 12/2015 | Tabet et al. | |
| 2021/0227604 A1* | 7/2021 | Huang | H04W 72/20 |
| 2022/0030661 A1* | 1/2022 | Jeong | H04W 76/28 |
| 2022/0053460 A1* | 2/2022 | Yu | H04W 76/28 |
| 2022/0095232 A1* | 3/2022 | Li | H04W 52/0235 |
| 2023/0014303 A1* | 1/2023 | Di Girolamo | H04W 72/20 |
| 2023/0066448 A1* | 3/2023 | Tseng | H04W 24/08 |
| 2023/0189390 A1* | 6/2023 | Park | H04W 76/28 370/252 |
| 2023/0209535 A1* | 6/2023 | Park | H04W 72/23 370/329 |
| 2023/0209648 A1* | 6/2023 | Park | H04W 4/40 370/329 |

FOREIGN PATENT DOCUMENTS

| | | | | |
|---|---|---|---|---|
| WO | WO-2021119474 A1 | * | 6/2021 | H04W 72/0406 |
| WO | WO-2021170210 A1 | * | 9/2021 | H04W 52/0216 |
| WO | WO-2022083952 A1 | * | 4/2022 | H04W 52/0216 |

OTHER PUBLICATIONS

3GPP TS 23.287 V16.4.0, 3rd Generation Partnership Project; Technical Specification Group Services and System Aspects; Architecture enhancements for 5G System (5GS) to support Vehicle-to-Everything (V2X) services, (Release 16), Sep. 2020.
LG Electronics, 'Discussion on physical layer design considering sidelink DRX operation', R1-2007897, 3GPP TSG RAN WG1 Meeting #103-e, section 2.7, Nov. 1, 2020.
Huawei et al., 'Consideration on the sidelink DRX for unicast, groupcast and broadcast', R2-2009413, 3GPP TSG RAN WG2 Meeting #112-e, sections 1, 2.1.2, Oct. 23, 2020.
Intel Corporation, 'On general sidelink DRX design', R2-2008978, 3GPP TSG RAN WG2 Meeting #112-e, sections 1-2.2.5, Oct. 23, 2020.
Interdigital Inc., 'Initial Discussion on SL DRX', R2-2009210, 3GPP TSG RAN WG2 Meeting #11 2-e, sections 1-2, Oct. 23, 2020.
International Search Report and Written Opinion dated Mar. 14, 2022, issued in International Patent Application No. PCT/KR2021/019001.
Extended European Search Report dated Apr. 24, 2024; European Appln. No. 21907069.5-1206 / 4245087 PCT/KR2021019001.

* cited by examiner

METHOD AND APPARATUS HANDLING SL DRX INACTIVITY TIMER IN WIRELESS COMMUNICATION SYSTEM

CROSS-REFERENCE TO RELATED APPLICATION(S)

This application is based on and claims priority under 35 U.S.C. § 119(a) of a Korean patent application number 10-2020-0175273, filed on Dec. 15, 2020, in the Korean Intellectual Property Office, the disclosure of which is incorporated by reference herein in its entirety.

BACKGROUND

1. Field

The disclosure relates to a wireless communication system. More particularly, the disclosure relates to an apparatus, a method or a system for handling sidelink discontinuous reception (DRX) inactivity timer in wireless communication system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

The 4G and 5G wireless communication systems support vehicle-to-everything (V2X) services. V2X services can be provided by PC5 interface and/or Uu interface. Support of V2X services via PC5 interface is provided by new radio (NR) sidelink communication or V2X sidelink communication Similar to Uu DRX, DRX for sidelink communication is being studied to minimize user equipment (UE) power consumption during sidelink communication.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a communication method and system for converging the 5G communication system for supporting higher data rates beyond the 4G.

Additional aspects will be set forth in part in the description which follows and, in part, will be apparent from the description, or may be learned by practice of the presented embodiments.

In accordance with an aspect of the disclosure, a method performed by a first UE in a wireless communication system is provided. The method includes receiving, from a second UE, first sidelink control information (SCI) including scheduling information, receiving, from the second UE, second SCI based on the scheduling information, identifying whether the second SCI indicates a new transmission, and in case that the second SCI indicates the new transmission, starting a sidelink DRX inactivity timer.

In accordance with another aspect of the disclosure, a method performed by a second UE in a wireless communication system is provided. The method includes transmitting, to a first UE, first sidelink control information (SCI) including scheduling information, transmitting, to the first UE, second SCI based on the scheduling information, identifying whether the second SCI indicates a new transmission, and in case that the second SCI indicates the new transmission, starting a sidelink DRX inactivity timer.

In accordance with another aspect of the disclosure, the first UE in a wireless communication system is provided. The first UE includes a transceiver and a controller. The controller is configured to receive, from a second UE via the transceiver, first sidelink control information (SCI) including scheduling information, receive, from the second UE via the transceiver, second SCI based on the scheduling information, identify whether the second SCI indicates a new transmission, and in case that the second SCI indicates the new transmission, start a sidelink DRX inactivity timer.

In accordance with another aspect of the disclosure, the second UE in a wireless communication system is provided. The second UE includes a transceiver and a controller. The controller is configured to transmit, to a first UE via the transceiver, first sidelink control information (SCI) including scheduling information, transmit, to the first UE via the transceiver, second SCI based on the scheduling information, identify whether the second SCI indicates a new transmission, and in case that the second SCI indicates the new transmission, start a sidelink DRX inactivity timer.

According to an embodiment of the disclosure, a UE can reduce power consumption when performing sidelink communication.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numerals are used to depict the same or similar elements, features, and structures.

DETAILED DESCRIPTION

Figure 1:
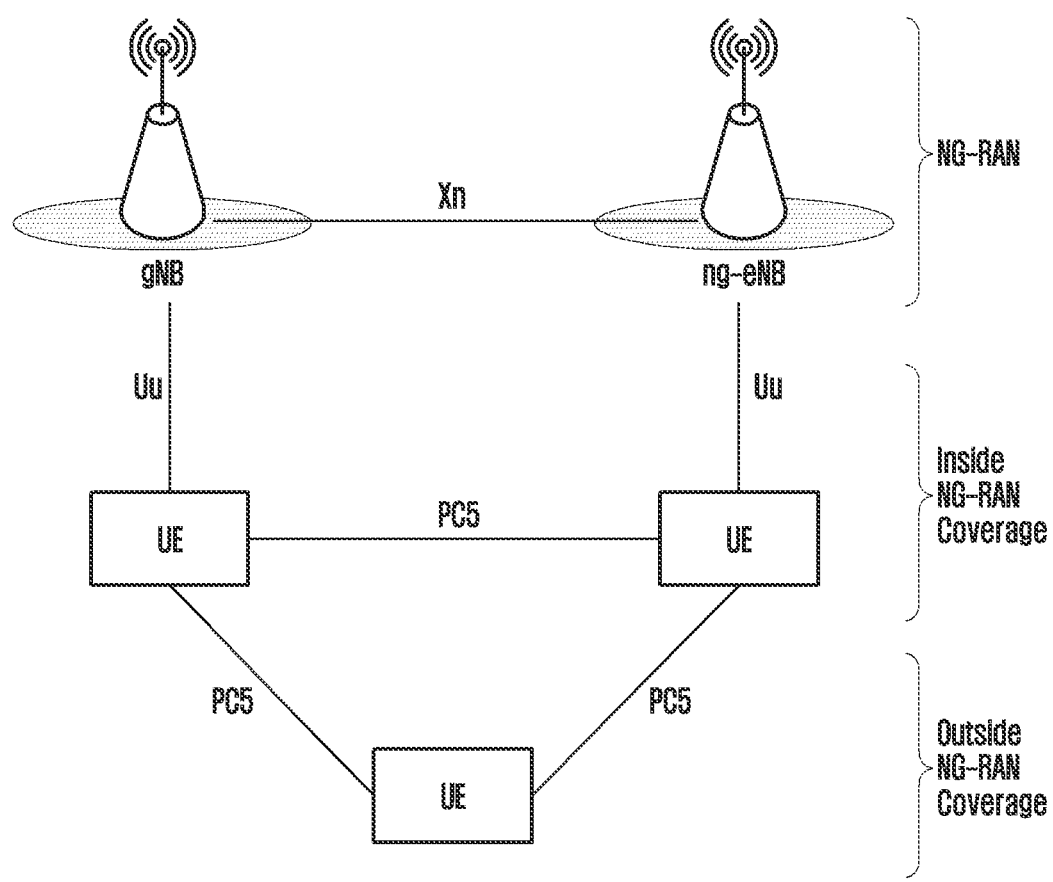
FIG. 1 illustrates a network architecture supporting NR sidelink communication and V2X sidelink communication according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is known to those skilled in the art that blocks of a flowchart (or sequence diagram) and a combination of flowcharts may be represented and executed by computer program instructions. These computer program instructions may be loaded on a processor of a general-purpose computer, special purpose computer, or programmable data processing equipment. When the loaded program instructions are executed by the processor, they create a means for carrying out functions described in the flowchart. Because the computer program instructions may be stored in a computer readable memory that is usable in a specialized computer or a programmable data processing equipment, it is also possible to create articles of manufacture that carry out functions described in the flowchart. Because the computer program instructions may be loaded on a computer or a programmable data processing equipment, when executed as processes, they may carry out operations of functions described in the flowchart.

A block of a flowchart may correspond to a module, a segment, or a code containing one or more executable instructions implementing one or more logical functions, or may correspond to a part thereof. In some cases, functions described by blocks may be executed in an order different from the listed order. For example, two blocks listed in sequence may be executed at the same time or executed in reverse order.

In this description, the words "unit", "module" or the like may refer to a software component or hardware component, such as, for example, a field-programmable gate array (FPGA) or an application-specific integrated circuit (ASIC) capable of carrying out a function or an operation. However, a "unit", or the like, is not limited to hardware or software. A unit, or the like, may be configured so as to reside in an addressable storage medium or to drive one or more processors. Units, or the like, may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose larger components and units. Components and units may be configured to drive a device or one or more processors in a secure multimedia card.

Prior to the detailed description, terms or definitions necessary to understand the disclosure are described. However, these terms should be construed in a non-limiting way.

A base station (BS) is an entity communicating with the UE and may be referred to as the BS, base transceiver station (BTS), node B (NB), evolved NB (eNB), access point (AP), 5G NB (5GNB), or gNB.

The UE is an entity communicating with the BS or is an entity communicating with another UE and may be referred to as UE, device, mobile station (MS), mobile equipment (ME), or terminal.

In the recent years several broadband wireless technologies have been developed to meet the growing number of broadband subscribers and to provide more and better applications and services. The 2nd generation wireless communication system has been developed to provide voice services while ensuring the mobility of users. 3rd generation wireless communication system supports not only the voice service but also data service. In recent years, the 4th wireless communication system has been developed to provide high-speed data service. However, currently, the 4G wireless communication system suffers from lack of resources to meet the growing demand for high speed data services. So the 5G wireless communication system (also referred as next generation radio or NR) is being developed to meet the growing demand for high speed data services, support ultra-reliability and low latency applications.

The 5G wireless communication system supports not only lower frequency bands but also in higher frequency (mmWave) bands, e.g., 10 GHz to 100 GHz bands, so as to accomplish higher data rates. To mitigate propagation loss of the radio waves and increase the transmission distance, the beamforming, massive MIMO, FD-MIMO, array antenna, an analog beam forming, large scale antenna techniques are being considered in the design of the 5G wireless communication system. In addition, the 5G wireless communication system is expected to address different use cases having quite different requirements in terms of data rate, latency, reliability, mobility etc. However, it is expected that the design of the air-interface of the 5G wireless communication system would be flexible enough to serve the UEs having quite different capabilities depending on the use case and market segment the UE cater service to the end customer. Few examples use cases the 5G wireless communication system wireless system is expected to address is enhanced Mobile Broadband (eMBB), massive Machine Type Communication (m-MTC), ultra-reliable low latency communication (URLL) etc. The eMBB requirements like tens of Gbps data rate, low latency, high mobility so on and so forth address the market segment representing the conventional wireless broadband subscribers needing internet connectivity everywhere, all the time and on the go. The m-MTC requirements like very high connection density, infrequent data transmission, very long battery life, low mobility address so on and so forth address the market segment representing the IoT/IoE envisioning connectivity of billions of devices. The URLL requirements like very low latency, very high reliability and variable mobility so on and so forth address the market segment representing the Industrial automation application, vehicle-to-vehicle/vehicle-to-infrastructure communication foreseen as one of the enablers for autonomous cars.

In the 5G wireless communication system operating in higher frequency (mmWave) bands, UE and gNB communicates with each other using Beamforming Beamforming techniques are used to mitigate the propagation path losses and to increase the propagation distance for communication at higher frequency band. Beamforming enhances the transmission and reception performance using a high-gain antenna. Beamforming can be classified into Transmission (TX) beamforming performed in a transmitting end and reception (RX) beamforming performed in a receiving end. In general, the TX beamforming increases directivity by allowing an area in which propagation reaches to be densely located in a specific direction by using a plurality of antennas. In this situation, aggregation of the plurality of antennas can be referred to as an antenna array, and each antenna included in the array can be referred to as an array element. The antenna array can be configured in various forms such as a linear array, a planar array, etc. The use of the TX beamforming results in the increase in the directivity of a signal, thereby increasing a propagation distance. Further, since the signal is almost not transmitted in a direction other than a directivity direction, a signal interference acting on another receiving end is significantly decreased. The receiving end can perform beamforming on a RX signal by using a RX antenna array. The RX beamforming increases the RX signal strength transmitted in a specific direction by allowing propagation to be concentrated in a specific direction, and excludes a signal transmitted in a direction other than the specific direction from the RX signal, thereby providing an effect of blocking an interference signal. By using beamforming technique, a transmitter can make plurality of transmit beam patterns of different directions. Each of these transmit beam patterns can be also referred as transmit (TX) beam. Wireless communication system operating at high frequency uses plurality of narrow TX beams to transmit signals in the cell as each narrow TX beam provides coverage to a part of cell. The narrower the TX beam, higher is the antenna gain and hence the larger the propagation distance of signal transmitted using beamforming A receiver can also make plurality of receive (RX) beam patterns of different directions. Each of these receive patterns can be also referred as receive (RX) beam.

The 5G wireless communication system, supports standalone mode of operation as well dual connectivity (DC). In DC a multiple RX/TX UE may be configured to utilize resources provided by two different nodes (or NBs) connected via non-ideal backhaul. One node acts as the Master Node (MN) and the other as the Secondary Node (SN). The MN and SN are connected via a network interface and at least the MN is connected to the core network. NR also supports Multi-RAT Dual Connectivity (MR-DC) operation whereby a UE in radio resource control (RRC)_CONNECTED is configured to utilize radio resources provided by two distinct schedulers, located in two different nodes connected via a non-ideal backhaul and providing either E-UTRA (i.e., if the node is an ng-eNB) or NR access (i.e., if the node is a gNB). In NR for a UE in RRC_CONNECTED not configured with CA/DC there is only one serving cell comprising of a primary cell (PCell). For a UE in RRC_CONNECTED configured with CA/DC the term 'serving cells' is used to denote the set of cells comprising of the Special Cell(s) and all secondary cells (SCells). In NR the term Master Cell Group (MCG) refers to a group of serving cells associated with the MN, comprising of the PCell and optionally one or more SCells. In NR the term Secondary Cell Group (SCG) refers to a group of serving cells associated with the SN, comprising of a Primary SCG Cell (PSCell) and optionally one or more SCells. In NR PCell) refers to a serving cell in MCG, operating on the primary frequency, in which the UE either performs the initial connection establishment procedure or initiates the connection re-establishment procedure. In NR for a UE configured with CA, Scell is a cell providing additional radio resources on top of Special Cell. The Primary SCG Cell (i.e., PSCell) refers to a serving cell in SCG in which the UE performs random access (RA) when performing the Reconfiguration with Sync procedure. For Dual Connectivity operation the term SpCell (i.e., Special Cell) refers to the PCell of the MCG or the PSCell of the SCG, otherwise the term Special Cell refers to the PCell.

In the 5G wireless communication system, Physical Downlink Control Channel (PDCCH) is used to schedule downlink (DL) transmissions on physical downlink shared channel (PDSCH) and uplink (UL) transmissions on physical uplink shared channel (PUSCH), where the Downlink Control Information (DCI) on PDCCH includes: Downlink assignments containing at least modulation and coding format, resource allocation, and hybrid-automatic repeat request (ARQ) information related to downlink shared channel (DL-SCH); Uplink scheduling grants containing at least modulation and coding format, resource allocation, and hybrid-ARQ information related to uplink shared channel (UL-SCH). In addition to scheduling, PDCCH can be used to for: Activation and deactivation of configured PUSCH transmission with configured grant; Activation and deactivation of PDSCH semi-persistent transmission; Notifying one or more UEs of the slot format; Notifying one or more UEs of the PRB(s) and orthogonal frequency division multiplexing (OFDM) symbol(s) where the UE may assume no transmission is intended for the UE; Transmission of transmit power control (TPC) commands for PUCCH and PUSCH; Transmission of one or more TPC commands for SRS transmissions by one or more UEs; Switching a UE's active bandwidth part; Initiating an RA procedure. A UE monitors a set of PDCCH candidates in the configured monitoring occasions in one or more configured COntrol REsource SETs (CORESETs) according to the corresponding search space configurations. A CORESET consists of a set of PRBs with a time duration of 1 to 3 OFDM symbols. The resource units Resource Element Groups (REGs) and Control Channel Elements (CCEs) are defined within a CORESET with each CCE consisting a set of REGs. Control channels are formed by aggregation of CCE. Different code rates for the control channels are realized by aggregating different number of CCE. Interleaved and non-interleaved CCE-to-REG mapping are supported in a CORESET. Polar coding is used for PDCCH. Each REG carrying PDCCH carries its own demodulation reference signal (DMRS). Quadrature phase-shift keying (QPSK) modulation is used for PDCCH.

In the 5G wireless communication system, a list of search space configurations is signaled by gNB for each configured Bandwidth Part (BWP) wherein each search configuration is uniquely identified by an identifier (ID). The ID of search space configuration to be used for specific purpose such as paging reception, SI reception, and RA response reception is explicitly signaled by gNB. In NR search space configuration comprises of parameters Monitoring-periodicity-PDCCH-slot, Monitoring-offset-PDCCH-slot, Monitoring-symbols-PDCCH-within-slot and duration. A UE determines PDCCH monitoring occasion (s) within a slot using the parameters PDCCH monitoring periodicity (Monitoring-periodicity-PDCCH-slot), the PDCCH monitoring offset (Monitoring-offset-PDCCH-slot), and the PDCCH monitoring pattern (Monitoring-symbols-PDCCH-within-slot). PDCCH monitoring occasions are there in slots 'x' to x+duration where the slot with number 'x' in a radio frame with number 'y' satisfies the equation below:

$$(y*(\text{number of slots in a radio frame})+x-\text{Monitoring-offset-PDCCH-slot}) \bmod (\text{Monitoring-periodicity-PDCCH-slot})=0;$$

The starting symbol of a PDCCH monitoring occasion in each slot having PDCCH monitoring occasion is given by Monitoring-symbols-PDCCH-within-slot. The length (in symbols) of a PDCCH monitoring occasion is given in the corset associated with the search space. Search space configuration includes the ID of CORESET configuration associated with it. A list of CORESET configurations are signaled by gNB for each configured BWP wherein each CORESET configuration is uniquely identified by an ID. Note that each radio frame is of 10 ms duration. Radio frame is identified by a radio frame number or system frame number. Each radio frame comprises of several slots wherein the number of slots in a radio frame and duration of slots depends on sub carrier spacing. The number of slots in a radio frame and duration of slots depends radio frame for each supported SCS is pre-defined in NR. Each CORESET configuration is associated with a list of Transmission configuration indicator (TCI) states. One DL reference signal (RS) ID Synchronization Signal and PBCH block (SSB) or channel state information reference signal (CSI RS) is configured per TCI state. The list of TCI states corresponding to the CORESET configuration is signaled by gNB via RRC signaling. One of the TCI state in TCI state list is activated and indicated to UE by gNB. TCI state indicates the DL TX beam (DL TX beam is QCLed with SSB/CSI RS of TCI state) used by gNB for transmission of PDCCH in the PDCCH monitoring occasions of a search space.

In the 5G wireless communication system bandwidth adaptation (BA) is supported. With BA, the receive and transmit bandwidth of a UE need not be as large as the bandwidth of the cell and can be adjusted: the width can be ordered to change (e.g. to shrink during period of low activity to save power); the location can move in the frequency domain (e.g. to increase scheduling flexibility); and the subcarrier spacing can be ordered to change (e.g. to allow different services). A subset of the total cell bandwidth of a cell is referred to as the BWP. BA is achieved by configuring RRC connected UE with BWP(s) and telling the UE which of the configured BWPs is currently the active one. When BA is configured, the UE only has to monitor PDCCH on the one active BWP i.e., it does not have to monitor PDCCH on the entire DL frequency of the serving cell. In RRC connected state, UE is configured with one or more DL and UL BWPs, for each configured Serving Cell (i.e., PCell or SCell). For an activated Serving Cell, there is always one active UL and DL BWP at any point in time. The BWP switching for a Serving Cell is used to activate an inactive BWP and deactivate an active BWP at a time. The BWP switching is controlled by the PDCCH indicating a downlink assignment or an UL grant, by the bwp-InactivityTimer, by RRC signaling, or by the medium access control (MAC) entity itself upon initiation of the RA procedure. Upon addition of SpCell or activation of an SCell, the DL BWP and UL BWP indicated by firstActiveDownlinkBWP-Id and firstActiveUplinkBWP-Id respectively is active without receiving PDCCH indicating a downlink assignment or an UL grant. The active BWP for a Serving Cell is indicated by either RRC or PDCCH. For unpaired spectrum, a DL BWP is paired with a UL BWP, and BWP switching is common for both UL and DL. Upon expiry of BWP inactivity timer UE switch to the active DL BWP to the default DL BWP or initial DL BWP (if default DL BWP is not configured).

In the 5G wireless communication system, RA is supported. The RA is used to achieve UL time synchronization. RA is used during initial access, handover, RRC connection re-establishment procedure, scheduling request transmission, the SCG addition/modification, beam failure recovery and data or control information transmission in UL by non-synchronized UE in RRC CONNECTED state. Several types of RA procedures are supported.

In the 5G wireless communication system, gNB or the BS in cell broadcast the SSB consists of primary and secondary synchronization signals (PSS, SSS) and system information. System information includes common parameters needed to communicate in cell. In the 5G wireless communication system (also referred as next generation radio or NR), System Information (SI) is divided into the MIB and a number of SIBs where:

the MIB is always transmitted on the BCH with a periodicity of 80 ms and repetitions made within 80 ms and it includes parameters that are needed to acquire SIB1 from the cell.

the SIB1 is transmitted on the DL-SCH with a periodicity of 160 ms and variable transmission repetition. The default transmission repetition periodicity of SIB1 is 20 ms but the actual transmission repetition periodicity is up to network implementation. The scheduling information in SIB 1 includes mapping between SIBs and SI messages, periodicity of each SI message and SI window length. The scheduling information in SIB 1 includes an indicator for each SI message, which indicates whether the concerned SI message is being broadcasted or not. If at least one SI message is not being broadcasted, SIB1 may include random access resources (PRACH preamble(s) and PRACH resource(s)) for requesting gNB to broadcast one or more SI message(s).

SIBs other than SIB1 are carried in SystemInformation (SI) messages, which are transmitted on the DL-SCH. Only SIBs having the same periodicity can be mapped to the same SI message. Each SI message is transmitted within periodically occurring time domain windows (referred to as SI-windows with same length for all SI messages). Each SI message is associated with a SI-window and the SI-windows of different SI messages do not overlap. That is, within one SI-window only the corresponding SI message is transmitted. Any SIB except SIB1 can be configured to be cell specific or area specific, using an indication in SIB1. The cell specific SIB is applicable only within a cell that provides the SIB while the area specific SIB is applicable within an area referred to as SI area, which consists of one or several cells and is identified by systemInformationAreaID.

In the 5G wireless communication system, RRC can be in one of the following states: RRC_IDLE, RRC_INACTIVE, and RRC_CONNECTED. A UE is either in RRC_CONNECTED state or in RRC_INACTIVE state when an RRC connection has been established. If this is not the case, i.e., no RRC connection is established, the UE is in RRC_IDLE state. The RRC states can further be characterized as follows:

In the RRC_IDLE, a UE specific DRX may be configured by upper layers. The UE monitors short Messages transmitted with P-RNTI over DCI; monitors a Paging channel for CN paging using 5G-S-TMSI; performs neighboring cell measurements and cell (re-)selection; acquires system information and can send SI request (if configured); performs logging of available measurements together with location and time for logged measurement configured UEs.

In RRC_INACTIVE, a UE specific DRX may be configured by upper layers or by RRC layer; UE stores the UE Inactive AS context; a RAN-based notification area is configured by RRC layer. The UE monitors Short Messages transmitted with P-RNTI over DCI; monitors a Paging channel for CN paging using 5G-S-TMSI and RAN paging using full I-RNTI; performs neighboring cell measurements and cell (re-)selection; performs RAN-based notification area updates periodically and when moving outside the configured RAN-based notification area; acquires system information and can send SI request (if configured); performs logging of available measurements together with location and time for logged measurement configured UEs.

In the RRC_CONNECTED, the UE stores the AS context and transfer of unicast data to/from UE takes place. The UE monitors Short Messages transmitted with P-RNTI over DCI, if configured; monitors control channels associated with the shared data channel to determine if data is scheduled for it; provides channel quality and feedback information; performs neighboring cell measurements and measurement reporting; acquires system information.

In the RRC_CONNECTED, network may initiate suspension of the RRC connection by sending RRCRelease with suspend configuration. When the RRC connection is suspended, the UE stores the UE Inactive AS context and any configuration received from the network, and transits to RRC_INACTIVE state. If the UE is configured with the SCG, the UE releases the SCG configuration upon initiating a RRC Connection Resume procedure. The RRC message to suspend the RRC connection is integrity protected and ciphered.

FIG. 1 illustrates a network architecture supporting NR sidelink communication and V2X sidelink communication according to an embodiment of the disclosure.

Referring to FIG. 1, the 4G and 5G wireless communication systems support vehicular communication services. Vehicular communication services, represented by V2X services, can consist of the following four different types: V2V, V2I, V2N and V2P. In the 5G (also referred as NR or New Radio) wireless communication system, V2X communication is being enhanced to support enhanced V2X use cases, which are broadly arranged into four use case groups:

1) Vehicles Platooning enables the vehicles to dynamically form a platoon travelling together. All the vehicles in the platoon obtain information from the leading vehicle to manage this platoon. This information allows the vehicles to drive closer than normal in a coordinated manner, going to the same direction and travelling together.

2) Extended Sensors enables the exchange of raw or processed data gathered through local sensors or live video images among vehicles, road site units, devices of pedestrian and V2X application servers. The vehicles can increase the perception of their environment beyond of what their own sensors can detect and have a broader and holistic view of the local situation. High data rate is one of the key characteristics.

3) Advanced Driving enables semi-automated or full-automated driving. Each vehicle and/or RSU shares its own perception data obtained from its local sensors with vehicles in proximity and that allows vehicles to synchronize and coordinate their trajectories or maneuvers. Each vehicle shares its driving intention with vehicles in proximity too.

4) Remote Driving enables a remote driver or a V2X application to operate a remote vehicle for those passengers who cannot drive by themselves or remote vehicles located in dangerous environments. For a case where variation is limited and routes are predictable, such as public transportation, driving based on cloud computing can be used. High reliability and low latency are the main requirements.

V2X services can be provided by PC5 interface and/or Uu interface. Support of V2X services via PC5 interface is provided by NR sidelink communication or V2X sidelink communication, which is a mode of communication whereby UEs can communicate with each other directly over the PC5 interface using NR technology or EUTRA technology respectively without traversing any network node. This communication mode is supported when the UE is served by RAN and when the UE is outside of RAN coverage. Only the UEs authorized to be used for V2X services can perform NR or V2X sidelink communication. The NG-RAN architecture supports the PC5 interface as illustrated in FIG. 1. Sidelink transmission and reception over the PC5 interface are supported when the UE is inside NG-RAN coverage, irrespective of which RRC state the UE is in, and when the UE is outside NG-RAN coverage. Support of V2X services via the PC5 interface can be provided by NR Sidelink Communication and/or V2X Sidelink Communication. NR Sidelink Communication may be used to support other services than V2X services.

NR or V2X Sidelink Communication can support three types of transmission modes. Unicast transmission, characterized by support of at least one PC5-RRC connection between peer UEs; Transmission and reception of control information and user traffic between peer UEs in sidelink; Support of sidelink hybrid automatic repeat request (HARQ) feedback; Support of radio link control (RLC) AM; and Support of sidelink radio link monitoring (RLM) for both peer UEs to detect RLF. Groupcast transmission, characterized by: Transmission and reception of user traffic among UEs belonging to a group in sidelink; Support of sidelink HARQ feedback. Broadcast transmission, characterized by: Transmission and reception of user traffic among UEs in sidelink.

The AS protocol stack for the control plane in the PC5 interface consists of RRC, packet data convergence protocol (PDCP), RLC and MAC sublayer, and the physical layer. The AS protocol stack for user plane in the PC5 interface consists of SDAP, PDCP, RLC and MAC sublayer, and the physical layer. Sidelink Radio bearers (SLRB) are categorized into two groups: sidelink data radio bearers (SL DRB) for user plane data and sidelink signaling radio bearers (SL SRB) for control plane data. Separate SL SRBs using different SCCHs are configured for PC5-RRC and PC5-S signaling respectively.

The MAC sublayer provides the following services and functions over the PC5 interface: Radio resource selection; Packet filtering; Priority handling between UL and sidelink transmissions for a given UE; Sidelink CSI reporting. With LCP restrictions in MAC, only sidelink logical channels belonging to the same destination can be multiplexed into a MAC PDU for every unicast, groupcast and broadcast transmission which is associated to the destination. NG-RAN can also control whether a sidelink logical channel can utilize the resources allocated to a configured sidelink grant Type 1. For packet filtering, a SL-SCH MAC header including portions of both Source Layer-2 ID and a Destination Layer-2 ID is added to each MAC protocol data unit (PDU) as specified. Logical channel identifier (LCID) included within a MAC subheader uniquely identifies a logical channel within the scope of the Source Layer-2 ID and Destination Layer-2 ID combination. The following logical channels are used in sidelink:

Sidelink Control Channel (SCCH): a sidelink channel for transmitting control information from one UE to other UE(s);

Sidelink Traffic Channel (STCH): a sidelink channel for transmitting user information from one UE to other UE(s);

Sidelink Broadcast Control Channel (SBCCH): a sidelink channel for broadcasting sidelink system information from one UE to other UE(s).

The following connections between logical channels and transport channels exist:

SCCH can be mapped to SL-SCH;

STCH can be mapped to SL-SCH;

SBCCH can be mapped to SL-BCH.

The RRC sublayer provides the following services and functions over the PC5 interface:

Transfer of a PC5-RRC message between peer UEs;

Maintenance and release of a PC5-RRC connection between two UEs;

Detection of sidelink radio link failure for a PC5-RRC connection.

A PC5-RRC connection is a logical connection between two UEs for a pair of Source and Destination Layer-2 IDs which is considered to be established after a corresponding PC5 unicast link is established as specified in TS 23.287. There is one-to-one correspondence between the PC5-RRC connection and the PC5 unicast link. A UE may have multiple PC5-RRC connections with one or more UEs for different pairs of Source and Destination Layer-2 IDs. Separate PC5-RRC procedures and messages are used for a UE to transfer UE capability and sidelink configuration including SLRB configuration to the peer UE. Both peer UEs can exchange their own UE capability and sidelink configuration using separate bi-directional procedures in both sidelink directions. If it is not interested in sidelink transmission, if sidelink RLF on the PC5-RRC connection is declared, or if the Layer-2 link release procedure is completed as specified in TS 23.287, UE releases the PC5-RRC connection.

The UE can operate in two modes for resource allocation in sidelink:

Scheduled resource allocation, characterized by:
  The UE needs to be RRC_CONNECTED in order to transmit data;
  NG-RAN schedules transmission resources.

UE autonomous resource selection, characterized by:
  The UE can transmit data when inside NG-RAN coverage, irrespective of which RRC state the UE is in, and when outside NG-RAN coverage;
  The UE autonomously selects transmission resources from a pool of resources.

For NR sidelink communication, the UE performs sidelink transmissions only on a single carrier.

Scheduled Resource Allocation: NG-RAN can dynamically allocate resources to the UE via the SL-RNTI on PDCCH(s) for NR sidelink Communication. In addition, NG-RAN can allocate sidelink resources to UE with two types of configured sidelink grants:

With type 1, RRC directly provides the configured sidelink grant for NR sidelink communication.

With type 2, RRC provides the periodicity of the configured sidelink grant while PDCCH can either signal and activate the configured sidelink grant, or deactivate it. The PDCCH provides the actual grant (i.e., resources) to be used. The PDCCH is addressed to SL-CS-RNTI for NR sidelink communication and SL Semi-Persistent Scheduling V-RNTI for V2X sidelink communication.

For the UE performing NR sidelink communication, there can be more than one configured sidelink grant activated at a time on the carrier configured for sidelink transmission. When beam failure or physical layer problem occurs on NR Uu, the UE can continue using the configured sidelink grant Type 1. During handover, the UE can be provided with configured sidelink grants via handover command, regardless of the type. If provided, the UE activates the configured sidelink grant Type 1 upon reception of the handover command The UE can send sidelink buffer status report to support scheduler operation in NG-RAN. The sidelink buffer status reports refer to the data that is buffered in for a group of logical channels (LCG) per destination in the UE. Eight LCGs are used for reporting of the sidelink buffer status reports. Two formats, which are SL buffer status report (BSR) and truncated SL BSR, are used.

UE Autonomous Resource Allocation: The UE autonomously selects sidelink grant from a pool of resources provided by broadcast system information or dedicated signaling while inside NG-RAN coverage or by preconfiguration while outside NG-RAN coverage.

For NR sidelink communication, the pools of resources can be provided for a given validity area where the UE does not need to acquire a new pool of resources while moving within the validity area, at least when this pool is provided by SIB (e.g. reuse valid area of NR SIB). NR SIB validity mechanism is reused to enable validity area for SL resource pool configured via broadcasted system information. The UE is allowed to temporarily use UE autonomous resource selection with random selection for sidelink transmission based on configuration of the exceptional transmission resource pool.

For V2X sidelink transmission, during handover, transmission resource pool configurations including exceptional transmission resource pool for the target cell can be signaled in the handover command to reduce the transmission interruption. In this way, the UE may use the V2X sidelink transmission resource pools of the target cell before the handover is completed as long as either synchronization is performed with the target cell in case eNB is configured as synchronization source or synchronization is performed with global navigation satellite system (GNSS) in case GNSS is configured as synchronization source. If the exceptional transmission resource pool is included in the handover command, the UE uses randomly selected resources from the exceptional transmission resource pool, starting from the reception of handover command If the UE is configured with scheduled resource allocation in the handover command, the UE continues to use the exceptional transmission resource pool while the timer associated with handover is running. If the UE is configured with autonomous resource selection in the target cell the UE continues to use the exceptional transmission resource pool until the sensing results on the transmission resource pools for autonomous resource selection are available. For exceptional cases (e.g. during RLF, during transition from RRC IDLE to RRC CONNECTED or during change of dedicated V2X sidelink resource pools within a cell), the UE may select resources in the exceptional pool provided in serving cell's SIB21 or in dedicated signaling based on random selection, and uses them temporarily. During cell reselection, the RRC_IDLE UE may use the randomly selected resources from the exceptional transmission resource pool of the reselected cell until the sensing results on the transmission resource pools for autonomous resource selection are available.

Figure 2:
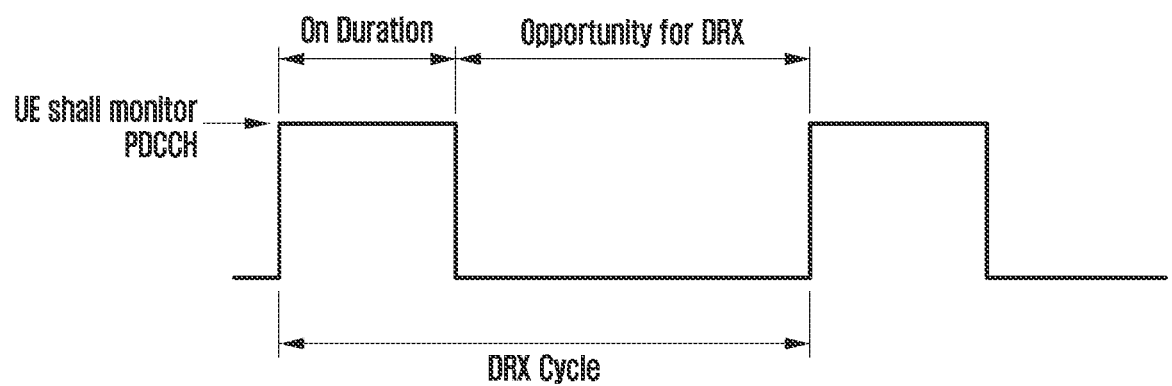
FIG. 2 illustrates a DRX cycle according to an embodiment of the disclosure.

FIG. 2 illustrates a DRX cycle according to an embodiment of the disclosure.

Referring to FIG. 2, in the 5G wireless communication system, the PDCCH monitoring activity of the UE in RRC connected mode is governed by DRX. When DRX is configured, the UE does not have to continuously monitor PDCCH. DRX is characterized by the following:

on-duration: duration that the UE waits for, after waking up, to receive PDCCHs. If the UE successfully decodes a PDCCH, the UE stays awake and starts the inactivity timer;

inactivity-timer: duration that the UE waits to successfully decode a PDCCH, from the last successful decoding of a PDCCH, failing which it can go back to sleep. The UE shall restart the inactivity timer following a single successful decoding of a PDCCH for a first transmission only (i.e., not for retransmissions);

retransmission-timer: duration until a retransmission can be expected;

cycle: specifies the periodic repetition of the on-duration followed by a possible period of inactivity;

active-time: total duration that the UE monitors PDCCH. This includes the "on-duration" of the DRX cycle, the time UE is performing continuous reception while the inactivity timer has not expired, and the time when the UE is performing continuous reception while waiting for a retransmission opportunity.

Similar to Uu DRX, DRX for SL communication is being studied to minimize UE power consumption during SL communication. Physical channels and signals for SL communication consists of Physical Sidelink Control Channel (PSCCH), Physical Sidelink Shared Channel (PSSCH), Physical Sidelink Feedback Channel (PSFCH), S-PSS, S-SSS and Physical Sidelink Broadcast Channel (PSBCH).

Physical Sidelink Control Channel (PSCCH) indicates resource and other transmission parameters used by a UE for PSSCH. PSCCH transmission is associated with a DM-RS.

Physical Sidelink Shared Channel (PSSCH) transmits the transmission blocks (TBs) of data themselves, and control information for HARQ procedures and CSI feedback triggers, etc. At least 6 OFDM symbols within a slot are used for PSSCH transmission. PSSCH transmission is associated with a DM-RS and may be associated with a PT-RS.

Physical Sidelink Feedback Channel (PSFCH) carries HARQ feedback over the sidelink from a UE which is an intended recipient of a PSSCH transmission to the UE which performed the transmission. PSFCH sequence is transmitted in one PRB repeated over two OFDM symbols near the end of the sidelink resource in a slot.

The Sidelink synchronization signal consists of sidelink primary and sidelink secondary synchronization signals (S-PSS, S-SSS), each occupying 2 symbols and 127 subcarriers. Physical Sidelink Broadcast Channel (PSBCH) occupies 9 and 5 symbols for normal and extended cyclic prefix cases respectively, including the associated DM-RS.

DRX cycle, on duration, inactivity timer, retransmission timer will be defined as in Uu DRX. One of the issues for SL DRX is when to (re-start) SL DRX inactivity timer for SL DRX operation.

Figure 3:
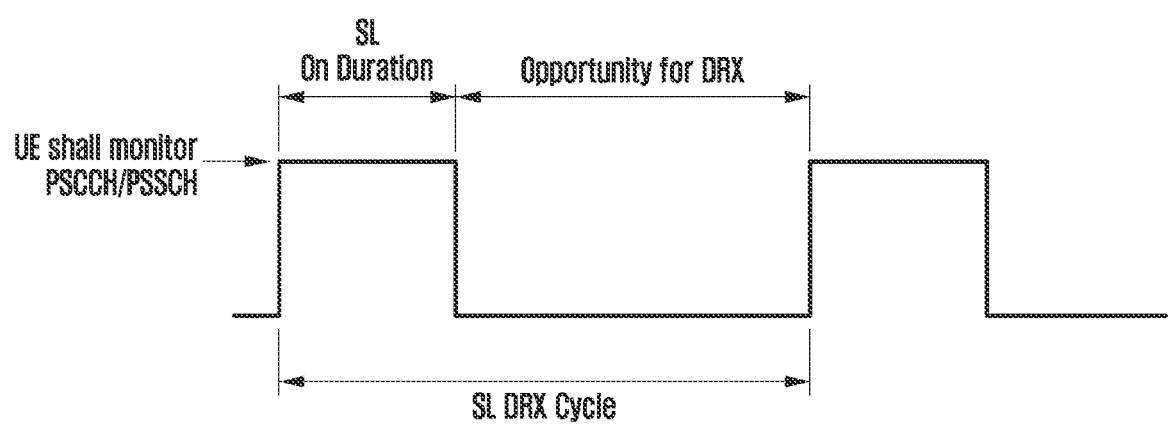
FIG. 3 illustrates a sidelink DRX cycle according to an embodiment of the disclosure.

FIG. 3 illustrates a sidelink DRX cycle according to an embodiment of the disclosure.

Figure 6:
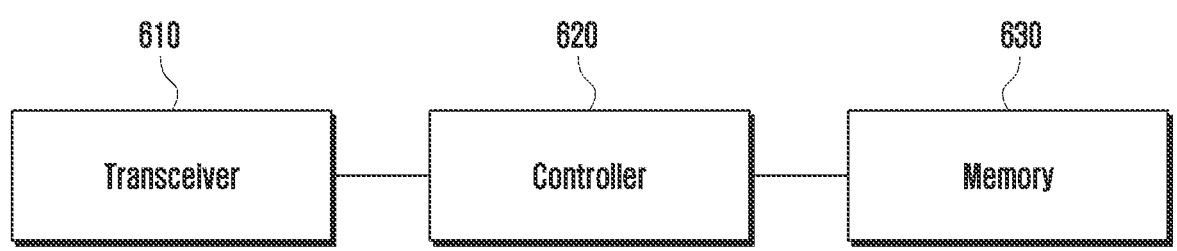
FIG. 6 illustrates a block diagram of a first terminal according to an embodiment of the disclosure.

Referring to FIG. 3, Sidelink DRX (SL DRX) can be configured to minimize power consumption during the SL communication. SL DRX configuration comprise of sl-OnDuration, sl-DRX-Cycle-Length as shown in FIG. 6. It may also include sl-DRX-Inactivity-Timer and sl-DRX-Retransmission-Timer. For SL unicast communication, the SL DRX configuration is per unicast connection. In an embodiment, SL DRX configuration is per UE per unicast connection. Each UE of a unicast connection can share its SL DRX configuration with peer UE using RRC signaling. In case of broadcast and group cast SL communication, SL DRX configuration is per broadcast and groupcast destination respectively. The SL DRX configuration can be signaled by gNB in dedicated signaling or system information. The dedicated signaling can be used when UE is in RRC Connected. The system information can be used when UE is in RRC IDLE or RRC INACTIVE. The SL DRX configuration can be pre-configured. The pre-configuration can be used when UE is out of coverage.

SL DRX active time includes the time while:
sl-On-Duration timer is running; or
sl-DRX-Inactivity-Timer is running; or
sl-DRX-Retransmission-Timer is running If SL DRX is configured, UE monitors PSCCH during the active time. In an embodiment, during the active time, UE monitors (i.e., receives) PSCCH and PSSCH.

For SL communication, 1st Stage SCI (sidelink control information) is transmitted over PSCCH. 1st stage SCI includes priority, frequency resource assignment, time resource assignment, resource reservation period, DMRS pattern, 2nd stage SCI format, MCS, number of DMRS port, etc. 2nd stage SCI is transmitted over PSSCH. 2nd stage SCI includes HARQ process number, network device interface (NDI), RV, Source ID, Destination ID, HARQ feedback enabled/disabled indicator, cast type, CSI request, Zone ID, range, etc. TB carrying SL MAC PDU is transmitted over PSSCH. PSCCH indicates PSSCH resources for scheduled TB.

Embodiment 1: In one embodiment of this disclosure, UE operation for handling SL DRX inactivity timer is as follows:

If 2nd stage SCI indicating a new transmission is received on PSSCH (or SCI indicating a new transmission is received):
if the scheduled TB is associated to unicast:
if the Destination ID field in the SCI is equal to X least significant bits (e.g. X can be 16 or any other value depending on size (in bits) of Destination ID field in the SCI i.e., if size of Destination ID field in the SCI is P bits then X is equal to P, P is an integer) of any of the Source Layer-2 ID(s) of the UE and Source ID field in the SCI is equal to Y least significant bits (e.g. Y can be 8 or any other value depending on size (in bits) of Source ID field in the SCI i.e., if size of Source ID field in the SCI is K bits then X is equal to K, K is an integer) of any of the Destination Layer-2 ID(s) of the UE for unicast communication:
UE starts or restarts corresponding sl-drx-Inactivity-Timer (if configured) in the first symbol after the end of the 2nd stage SCI reception (alternately starts or restarts corresponding sl-drx-Inactivity-Timer in the first slot after the end of the 2nd stage SCI reception).
UE may be in unicast communication with several UEs. The sl-drx-InactivityTimer can be independently maintained separately for each unicast connection. UE will start sl-drx-InactivityTimer corresponding to unicast connection for which TB is scheduled.
Else if the scheduled TB is associated to groupcast:
if the Destination ID field in the 2nd stage SCI is equal to X least significant bits (e.g. X can be 16 or any other value depending on size (in bits) of Destination ID field in the SCI i.e., if size of Destination ID field in the SCI is P bits then X is equal to P, P is an integer) of any of the Destination Layer-2 ID(s) of the UE for groupcast communication:
UE starts or restarts corresponding sl-drx-Inactivity-Timer (if configured) in the first symbol after the end of the 2nd stage SCI reception.
UE may be in group communication with several groups. The sl-drx-InactivityTimer can be independently maintained separately for each group (i.e., for each group Destination Layer-2 ID). UE will start sl-drx-InactivityTimer corresponding to group for which TB is scheduled.
Else if the scheduled TB is associated to broadcast:
if the Destination ID field in the 2nd stage SCI is equal to X least significant bits (e.g. X can be 16 or any other value depending on size (in bits) of Destination ID field in the SCI i.e., if size of Destination ID field in the SCI is P bits then X is equal to P, P is an integer) of any of the Destination Layer-2 ID(s) of the UE for broadcast communication:
UE starts or restarts sl-drx-InactivityTimer (if configured) in the first symbol after the end of the 2nd stage SCI reception.
UE may be in broadcast communication with several broadcast services. The sl-drx-InactivityTimer can be independently maintained separately for each broadcast Destination Layer-2 ID). UE will start sl-drx-InactivityTimer corresponding to broadcast Destination Layer-2 ID for which TB is scheduled.

In the above operation UE determines that SCI indicates new transmission if the following condition is met:
The NDI has been toggled (i.e., changed from 0 to 1 or from 1 to 0) compared to the NDI value of the previous received transmission corresponding to the Sidelink identification information (i.e., Destination Layer-1 ID and the Source Layer-1 ID) and the Sidelink process ID of the SCI or if this is the very first received transmission for the pair of the Sidelink identification information (i.e., Destination Layer-1 ID and the Source Layer-1 ID of the SCI) and the Sidelink process ID. Destination Layer-1 ID and the Source Layer-1 ID are indicated by Destination ID field and Source ID field of the SCI.

In the above operation UE determines whether the scheduled TB is associated with unicast or broadcast or groupcast based on cast type field in SCI (i.e., is 2nd stage SCI).

Figure 4:
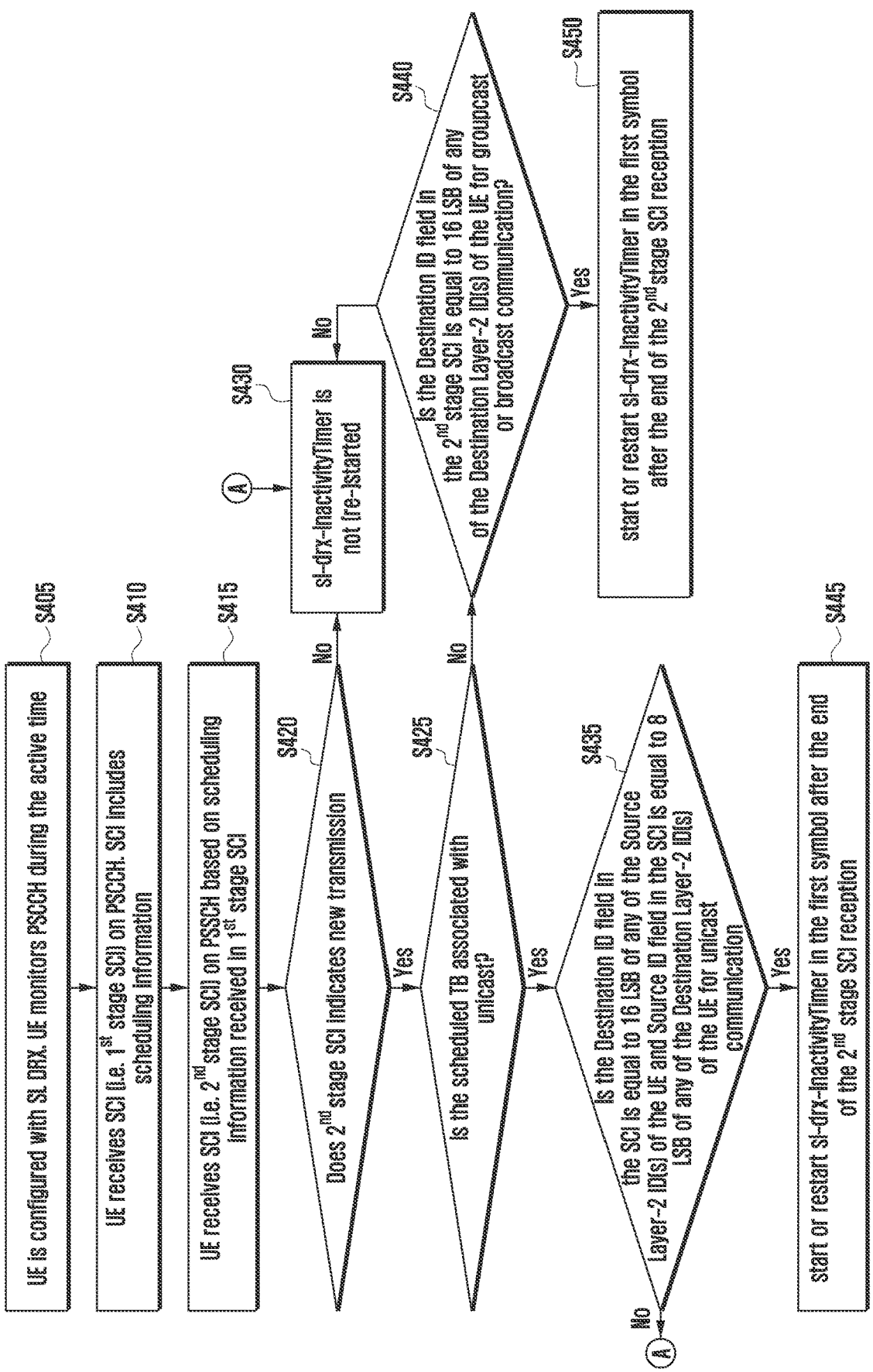
FIG. 4 illustrates an example operation for handling inactivity timer according to an embodiment of the disclosure.

FIG. 4 illustrates an example operation for handling inactivity timer according to an embodiment of the disclosure.

Referring to FIG. 4, in operation S405, a UE is configured with SL DRX. The UE monitors PSCCH during the active time. In operation S410, the UE receives SCI (i.e., 1st stage SCI) on PSCCH. The SCI includes scheduling information. In operation S415, the UE receives SCI (i.e., 2nd stage SCI) on PSSCH based on the scheduling information received in the 1st stage SCI. In operation S420, the UE identifies whether the 2nd stage SCI indicates new transmission. In operation S425, if the 2nd stage SCI indicates new transmission, the UE identifies whether scheduled TB (transport block) is associated with unicast. In operation S430, if the 2nd stage SCI does not indicate new transmission, sl-drx-InactivityTimer is not (re-)started. In operation S435, if the scheduled TB is associated with unicast, the UE identifies whether the Destination ID field in the 2nd stage SCI is equal to 16 least significant bits of the Source Layer-2 ID(s) of the UE, and the Source ID field in the 2nd stage SCI is equal to 8 least significant bits of the Destination Layer-2 ID(s) of the UE for unicast communication. In operation S440, if the scheduled TB is not associated with unicast (if the scheduled TB is associated with groupcast or broadcast), the UE identifies whether the Destination ID field in the 2nd stage SCI is equal to 16 least significant bits of the Destination Layer-2 ID(s) of the UE for groupcast or broadcast. In operation S445, if the Destination ID field in the 2nd stage SCI is equal to 16 least significant bits of the Source Layer-2 ID(s) of the UE, and the Source ID field in the 2nd stage SCI is equal to 8 least significant bits of the Destination Layer-2 ID(s) of the UE for unicast communication, the UE starts or restarts sl-drx-InactivityTimer in the first symbol after the end of the 2nd stage SCI reception, or if not, sl-drx-InactivityTimer is not (re-)started. In operation S450, if the Destination ID field in the 2nd stage SCI is equal to 16 least significant bits of the Destination Layer-2 ID(s) of the UE for groupcast or broadcast, the UE starts or restarts sl-drx-InactivityTimer in the first symbol after the end of the 2nd stage SCI reception, or if not, sl-drx-InactivityTimer is not (re-)started.

In another embodiment of this disclosure, UE operation for handling SL DRX inactivity timer is as follows:

If 2nd stage SCI indicating a new transmission is transmitted on PSSCH (or SCI indicating a new transmission is transmitted):
  if the scheduled TB is associated to unicast:
    if the Destination ID field in the SCI is equal to X least significant bits (e.g. X can be 16 or any other value depending on size (in bits) of Destination ID field in the SCI i.e., if size of Destination ID field in the SCI is P bits then X is equal to P, P is an integer) of any of the Destination Layer-2 ID(s) of the UE for unicast communication and Source ID field in the SCI is equal to Y least significant bits (e.g. Y can be 8 or any other value depending on size (in bits) of Source ID field in the SCI i.e., if size of Source ID field in the SCI is K bits then X is equal to K, K is an integer) of any of the Source Layer-2 ID(s) of the UE:
      UE starts or restarts corresponding sl-drx-InactivityTimer (if configured) in the first symbol after the end of the 2nd stage SCI transmission (alternately starts or restarts corresponding sl-drx-InactivityTimer in the first slot after the end of the 2nd stage SCI transmission).
      UE may be in unicast communication with several UEs. The sl-drx-InactivityTimer can be independently maintained separately for each unicast connection. UE will start sl-drx-InactivityTimer corresponding to unicast connection for which TB is scheduled.
  Else if the scheduled TB is associated to groupcast:
    if the Destination ID field in the 2nd stage SCI is equal to X least significant bits (e.g. X can be 16 or any other value depending on size (in bits) of Destination ID field in the SCI i.e., if size of Destination ID field in the SCI is P bits then X is equal to P, P is an integer) of any of the Destination Layer-2 ID(s) of the UE for groupcast communication:
      UE starts or restarts corresponding sl-drx-InactivityTimer (if configured) in the first symbol after the end of the 2nd stage SCI transmission.
      UE may be in group communication with several groups. The sl-drx-InactivityTimer can be independently maintained separately for each group (i.e., for each group Destination Layer-2 ID). UE will start sl-drx-InactivityTimer corresponding to group for which TB is scheduled.
  Else if the scheduled TB is associated to broadcast:
    if the Destination ID field in the 2nd stage SCI is equal to X least significant bits (e.g. X can be 16 or any other value depending on size (in bits) of Destination ID field in the SCI i.e., if size of Destination ID field in the SCI is P bits then X is equal to P, P is an integer) of any of the Destination Layer-2 ID(s) of the UE for broadcast communication:
      UE starts or restarts sl-drx-InactivityTimer (if configured) in the first symbol after the end of the 2nd stage SCI transmission.
      UE may be in broadcast communication with several broadcast services. The sl-drx-InactivityTimer can be independently maintained separately for each broadcast Destination Layer-2 ID). UE will start sl-drx-InactivityTimer corresponding to broadcast Destination Layer-2 ID for which TB is scheduled.

Embodiment 2: In one embodiment of this disclosure, UE operation for handling SL DRX inactivity timer is as follows:

If 2nd stage SCI indicating a new transmission is received on PSSCH (or SCI indicating a new transmission is received):
  if the scheduled TB is associated to unicast:
    if HARQ feedback is enabled for this TB:
      if the Destination ID field in the SCI is equal to X least significant bits (e.g. X can be 16 or any other value depending on size (in bits) of Destination ID field in the SCI i.e., if size of Destination ID field in the SCI is P bits then X is equal to P, P is an integer) of any of the Source Layer-2 ID(s) of the UE and Source ID field in the SCI is equal to Y least significant bits (e.g. Y can be 8 or any other value depending on size (in bits) of Source ID field in the SCI i.e., if size of Source ID field in the SCI is K bits then X is equal to K, K is an integer) of any of the Destination Layer-2 ID(s) of the UE for unicast communication:
        UE starts or restarts corresponding sl-drx-InactivityTimer (if configured) in the first symbol after the end of the 2nd stage SCI reception (alternately starts or restarts corresponding sl-drx-InactivityTimer in the first slot after the end of the 2nd stage SCI reception).
        UE may be in unicast communication with several UEs. The sl-drx-InactivityTimer can be independently maintained separately for each unicast connection. UE will start sl-drx-InactivityTimer corresponding to unicast connection for which TB is scheduled.

In the above operation UE determines that SCI indicates new transmission if the following condition is met:
  The NDI has been toggled (i.e., changed from 0 to 1 or from 1 to 0) compared to the NDI value of the previous received transmission corresponding to the Sidelink identification information (i.e., Destination Layer-1 ID and the Source Layer-1 ID) and the Sidelink process ID of the SCI or if this is the very first received transmission for the pair of the Sidelink identification information (i.e., Destination Layer-1 ID and the Source Layer-1 ID of the SCI) and the Sidelink process ID.

In the above operation UE determines whether the scheduled TB is associated with unicast based on cast type field in SCI (i.e., is 2nd stage SCI).

In the above operation UE determines whether the HARQ feedback is enabled or not based on SCI format or field in SCI.

Figure 5:
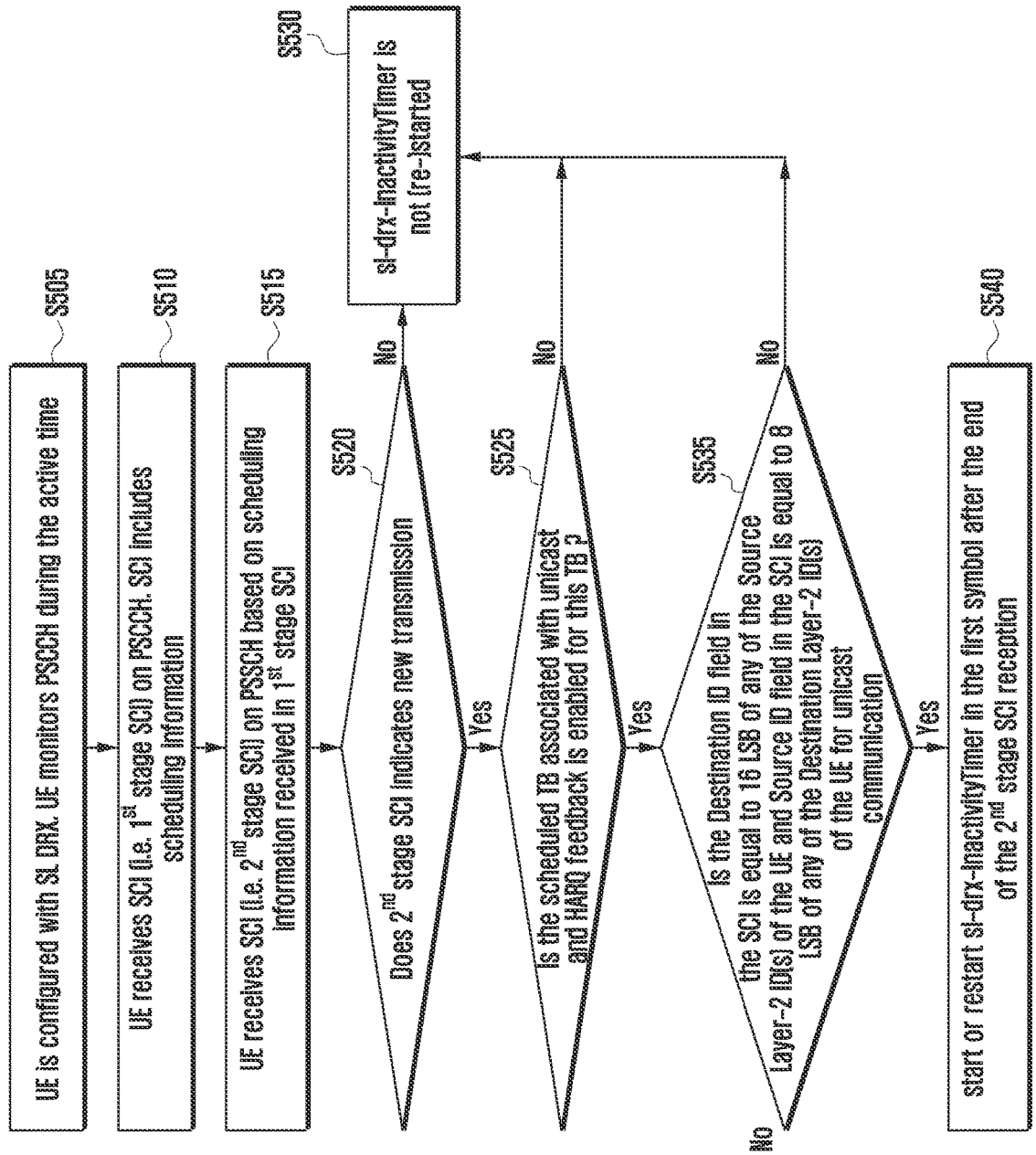
FIG. 5 illustrates an example operation for handling inactivity timer according to an embodiment of the disclosure.

FIG. 5 illustrates an example operation for handling inactivity timer according to an embodiment of the disclosure.

Referring to FIG. 5, in operation S505, a UE is configured with SL DRX. The UE monitors PSCCH during the active time. In operation S510, the UE receives SCI (i.e., 1st stage SCI) on PSCCH. The SCI includes scheduling information. In operation S515, the UE receives SCI (i.e., 2nd stage SCI) on PSSCH based on the scheduling information received in the 1st stage SCI. In operation S520, the UE identifies whether the 2nd stage SCI indicates new transmission. In operation S525, if the 2nd stage SCI indicates new transmission, the UE identifies whether scheduled TB (transport block) is associated with unicast and whether an HARQ feedback is enabled for this TB. In operation S530, if the 2nd stage SCI does not indicate new transmission, sl-drx-InactivityTimer is not (re-)started. In operation S535, if the scheduled TB is associated with unicast and the HARQ feedback is enabled for this TB, the UE identifies whether the Destination ID field in the 2nd stage SCI is equal to 16 least significant bits of any of the Source Layer-2 ID(s) of the UE, and the Source ID field in the 2nd stage SCI is equal to 8 least significant bits of LSB of any of the Destination Layer-2 ID(s) of the UE for unicast communication, or if not, sl-drx-InactivityTimer is not (re-)started. In operation S540, if the Destination ID field in the 2nd stage SCI is equal to 16 least significant bits of any of the Source Layer-2 ID(s) of the UE, and the Source ID field in the 2nd stage SCI is equal to 8 least significant bits of the Destination Layer-2 ID(s) of the UE for unicast communication, the UE starts or restarts sl-drx-InactivityTimer in the first symbol after the end of the 2nd stage SCI reception, or if not, sl-drx-InactivityTimer is not (re-)started.

In another embodiment of this disclosure, UE operation for handling SL DRX inactivity timer is as follows:

If 2nd stage SCI indicating a new transmission is transmitted on PSSCH (or SCI indicating a new transmission is transmitted):
  if the scheduled TB is associated to unicast:
    if HARQ feedback is enabled for this TB:
      if the Destination ID field in the SCI is equal to X least significant bits (e.g. X can be 16 or any other value depending on size (in bits) of Destination ID field in the SCI i.e., if size of Destination ID field in the SCI is P bits then X is equal to P, P is an integer) of any of the Destination Layer-2 ID(s) of the UE for unicast communication and Source ID field in the SCI is equal to Y least significant bits (e.g. Y can be 8 or any other value depending on size (in bits) of Source ID field in the SCI i.e., if size of Destination ID field in the SCI is K bits then X is equal to K, K is an integer) of any of the Source Layer-2 ID(s) of the UE:
        UE starts or restarts corresponding sl-drx-InactivityTimer (if configured) in the first symbol after the end of the 2nd stage SCI transmission (alternately starts or restarts corresponding sl-drx-InactivityTimer in the first slot after the end of the 2nd stage SCI transmission).
        UE may be in unicast communication with several UEs. The sl-drx-InactivityTimer can be independently maintained separately for each unicast connection. UE will start sl-drx-InactivityTimer corresponding to unicast connection for which TB is scheduled.

Embodiment 3: In one embodiment of this disclosure, UE operation for handling SL DRX inactivity timer is as follows:

If 2nd stage SCI indicating a new transmission is received on PSSCH (or SCI indicating a new transmission is received):
  if the scheduled TB is associated to unicast:
    if HARQ feedback is enabled for this TB:
      if the Destination ID field in the SCI is equal to X least significant bits (e.g. X can be 16 or any other value depending on size (in bits) of Destination ID field in the SCI i.e., if size of Destination ID field in the SCI is P bits then X is equal to P, P is an integer) of any of the Source Layer-2 ID(s) of the UE and Source ID field in the SCI is equal to Y least significant bits (e.g. Y can be 8 or any other value depending on size (in bits) of Source ID field in the SCI i.e., if size of Source ID field in the SCI is K bits then X is equal to K, K is an integer) of any of the Destination Layer-2 ID(s) of the UE for unicast communication:
        UE starts or restarts corresponding sl-drx-InactivityTimer (if configured) in the first symbol after the end of the 2nd stage SCI reception (alternately starts or restarts corresponding sl-drx-InactivityTimer in the first slot after the end of the 2nd stage SCI reception).
        UE may be in unicast communication with several UEs. The sl-drx-InactivityTimer can be independently maintained separately for each unicast connection. UE will start sl-drx-InactivityTimer corresponding to unicast connection for which TB is scheduled.
  Else if the scheduled TB is associated to groupcast:
    if the Destination ID field in the 2nd stage SCI is equal to X least significant bits (e.g. X can be 16 or any other value depending on size (in bits) of Destination ID field in the SCI i.e., if size of Destination ID field in the SCI is P bits then X is equal to P, P is an integer) of any of the Destination Layer-2 ID(s) of the UE for groupcast communication:
      if HARQ feedback is enabled for this TB:
        UE starts or restarts corresponding sl-drx-InactivityTimer (if configured) in the first symbol after the end of the 2nd stage SCI reception.
        UE may be in group communication with several groups. The sl-drx-InactivityTimer can be independently maintained separately for each group (i.e., for each group Destination Layer-2 ID). UE will start sl-drx-InactivityTimer corresponding to group for which TB is scheduled.
  Else if the scheduled TB is associated to broadcast:
    if the Destination ID field in the 2nd stage SCI is equal to X least significant bits (e.g. X can be 16 or any other value depending on size (in bits) of Destination ID field in the SCI i.e., if size of Destination ID field in the SCI is P bits then X is equal to P, P is an integer) of any of the Destination Layer-2 ID(s) of the UE for broadcast communication:
      if HARQ feedback is enabled for this TB:
        UE starts or restarts sl-drx-InactivityTimer (if configured) in the first symbol after the end of the 2nd stage SCI reception.

UE may be in broadcast communication with several broadcast services. The sl-drx-InactivityTimer can be independently maintained separately for each broadcast Destination Layer-2 ID). UE will start sl-drx-InactivityTimer corresponding to broadcast Destination Layer-2 ID for which TB is scheduled.

In the above operation UE determines that SCI indicates new transmission if the following condition is met:

The NDI has been toggled (i.e., changed from 0 to 1 or from 1 to 0) compared to the NDI value of the previous received transmission corresponding to the Sidelink identification information (i.e., Destination Layer-1 ID and the Source Layer-1 ID) and the Sidelink process ID of the SCI or if this is the very first received transmission for the pair of the Sidelink identification information (i.e., Destination Layer-1 ID and the Source Layer-1 ID of the SCI) and the Sidelink process ID.

In the above operation UE determines whether the scheduled TB is associated with unicast or broadcast or groupcast based on cast type field in SCI (i.e., is 2nd stage SCI).

In another embodiment of this disclosure, UE operation for handling SL DRX inactivity timer is as follows:

If 2nd stage SCI indicating a new transmission is transmitted on PSSCH (or SCI indicating a new transmission is transmitted):
  if the scheduled TB is associated to unicast and if HARQ feedback is enabled for this TB:
    if the Destination ID field in the SCI is equal to X least significant bits (e.g. X can be 16 or any other value depending on size (in bits) of Destination ID field in the SCI i.e., if size of Destination ID field in the SCI is P bits then X is equal to P, P is an integer) of any of the Destination Layer-2 ID(s) of the UE for unicast communication and Source ID field in the SCI is equal to Y least significant bits (e.g. Y can be 8 or any other value depending on size (in bits) of Source ID field in the SCI i.e., if size of Source ID field in the SCI is K bits then X is equal to K, K is an integer) of any of the Source Layer-2 ID(s) of the UE:
      UE starts or restarts corresponding sl-drx-InactivityTimer (if configured) in the first symbol after the end of the 2nd stage SCI transmission (alternately starts or restarts corresponding sl-drx-InactivityTimer in the first slot after the end of the 2nd stage SCI transmission).
      UE may be in unicast communication with several UEs. The sl-drx-InactivityTimer can be independently maintained separately for each unicast connection. UE will start sl-drx-InactivityTimer corresponding to unicast connection for which TB is scheduled.
  Else if the scheduled TB is associated to groupcast and if HARQ feedback is enabled for this TB:
    if the Destination ID field in the 2nd stage SCI is equal to X least significant bits (e.g. X can be 16 or any other value depending on size (in bits) of Destination ID field in the SCI i.e., if size of Destination ID field in the SCI is P bits then X is equal to P, P is an integer) of any of the Destination Layer-2 ID(s) of the UE for groupcast communication:
      UE starts or restarts corresponding sl-drx-InactivityTimer (if configured) in the first symbol after the end of the 2nd stage SCI transmission.
      UE may be in group communication with several groups. The sl-drx-InactivityTimer can be independently maintained separately for each group (i.e., for each group Destination Layer-2 ID). UE will start sl-drx-InactivityTimer corresponding to group for which TB is scheduled.
  Else if the scheduled TB is associated to broadcast and if HARQ feedback is enabled for this TB:
    if the Destination ID field in the 2nd stage SCI is equal to X bit(s) of LSB part (e.g. X can be 16 or any other value depending on size (in bits) of Destination ID field in the SCI i.e., if size of Destination ID field in the SCI is P bits then X is equal to P, P is an integer) of any of the Destination Layer-2 ID(s) of the UE for broadcast communication:
      UE starts or restarts sl-drx-InactivityTimer (if configured) in the first symbol after the end of the 2nd stage SCI transmission.
      UE may be in broadcast communication with several broadcast services. The sl-drx-InactivityTimer can be independently maintained separately for each broadcast Destination Layer-2 ID). UE will start sl-drx-InactivityTimer corresponding to broadcast Destination Layer-2 ID for which TB is scheduled.

Embodiment 4:

Unicast connection is established between UE 1 and UE 2.

UE 1 sends CSI request to UE 2. CSI Request is included in stage 2 SCI. Stage 2 SCI is transmitted on PSSCH.

UE 2 upon receiving CSI request starts a timer (sl-CSI-ReportTimer).

If UE2 obtains the SL grant while the timer is running:
  UE 2 generates SL MAC PDU carrying CSI report MAC CE.
  UE 2 transmit SCI 1 in PSCCH resource, transmits SCI 2 in PSSCH resource and SL MAC PDU in PSSCH resource.

In order to avoid missing the SL CSI report, in one embodiment of this disclosure:
  UE starts timer (sl-drx-InactivityTimer corresponding to this unicast connection) immediately after the slot in which 2nd stage SCI including the CSI request is transmitted by it.

FIG. 6 illustrates a block diagram of a first terminal according to an embodiment of the disclosure.

In an embodiment, the first terminal may be a receiving UE for sidelink communication.

Referring to FIG. 6, a first terminal includes a transceiver 610, a controller 620 and a memory 630. The controller 620 may refer to a circuitry, the ASIC, or at least one processor. The transceiver 610, the controller 620 and the memory 630 are configured to perform the operations of the UE illustrated in the figures, e.g. FIGS. 1 to 5, or described above. Although the transceiver 610, the controller 620 and the memory 630 are shown as separate entities, they may be realized as a single entity like a single chip. Or, the transceiver 610, the controller 620 and the memory 630 may be electrically connected to or coupled with each other.

The transceiver 610 may transmit and receive signals to and from other network entities, e.g., the BS or other terminals.

The controller 620 may control the UE to perform functions according to one of the embodiments described above.

For example, the controller 620 is configured to receive, from a second UE via the transceiver, first sidelink control information (SCI) including scheduling information, receive, from the second UE via the transceiver, second SCI based on the scheduling information, identify whether the second SCI indicates a new transmission, and in case that the second SCI indicates the new transmission, start a sidelink DRX inactivity timer.

In an embodiment, the operations of the first terminal may be implemented using the memory 630 storing corresponding program codes. Specifically, the first terminal may be equipped with the memory 630 to store program codes implementing desired operations. To perform the desired operations, the controller 620 may read and execute the program codes stored in the memory 630 by using a processor or a central processing unit (CPU).

Figure 7:
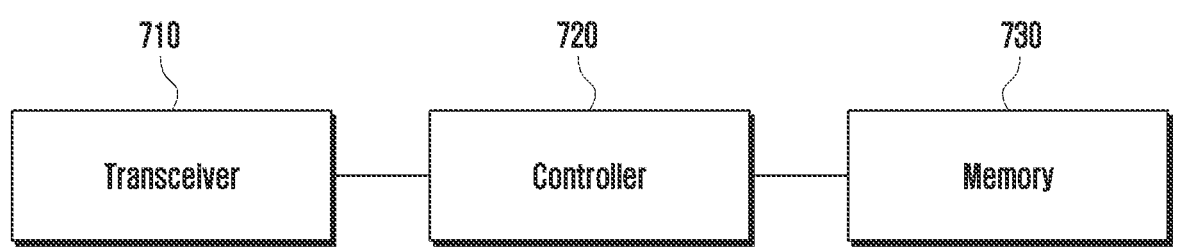
FIG. 7 illustrates a block diagram of a second terminal according to an embodiment of the disclosure.

FIG. 7 illustrates a block diagram of a second terminal according to an embodiment of the disclosure.

In an embodiment, the second terminal may be a transmitting UE for sidelink communication.

Referring to FIG. 7, a second terminal includes a transceiver 710, a controller 720 and a memory 730. The controller 720 may refer to a circuitry, the ASIC, or at least one processor. The transceiver 710, the controller 720 and the memory 730 are configured to perform the operations of the UE illustrated in the figures, e.g. FIGS. 1 to 5, or described above. Although the transceiver 710, the controller 720 and the memory 730 are shown as separate entities, they may be realized as a single entity like a single chip. Or, the transceiver 710, the controller 720 and the memory 730 may be electrically connected to or coupled with each other.

The transceiver 710 may transmit and receive signals to and from other network entities, e.g., the BS or other terminals.

The controller 720 may control the UE to perform functions according to one of the embodiments described above.

For example, the controller 720 is configured to transmit, to a first UE via the transceiver, first sidelink control information (SCI) including scheduling information, transmit, to the first UE via the transceiver, second SCI based on the scheduling information, identify whether the second SCI indicates a new transmission, and in case that the second SCI indicates the new transmission, start a sidelink DRX inactivity timer.

In an embodiment, the operations of the second terminal may be implemented using the memory 730 storing corresponding program codes. Specifically, the second terminal may be equipped with the memory 730 to store program codes implementing desired operations. To perform the desired operations, the controller 720 may read and execute the program codes stored in the memory 730 by using a processor or a central processing unit (CPU).

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a first user equipment (UE) in a wireless communication system, the method comprising:
   receiving, from a second UE, first stage sidelink control information (SCI) on a physical sidelink control channel (PSCCH), the first stage SCI including scheduling information;
   receiving, from the second UE, second stage SCI on a physical sidelink shared channel (PSSCH) based on the scheduling information; and
   in case that the second stage SCI indicates a new sidelink transmission, starting a sidelink discontinuous reception (DRX) inactivity timer in a first slot after the reception of the second stage SCI.

2. The method of claim 1, wherein the starting of the sidelink DRX inactivity timer comprises:
   in case that a source identifier (ID) of the second stage SCI is equal to 8 least significant bits (LSBs) of a destination layer-2 ID for unicast of the first UE, a destination ID of the second stage SCI is equal to 16 LSBs of a source layer-2 ID for unicast of the first UE, and a cast type indicator in the second stage SCI is set to unicast, starting the sidelink DRX inactivity timer.

3. The method of claim 2, wherein the sidelink DRX inactivity timer is associated with a corresponding source layer-2 ID and destination layer-2 ID pair for unicast.

4. The method of claim 1, wherein the starting of the sidelink DRX inactivity timer comprises:
   in case that a destination identifier (ID) of the second stage SCI is equal to 16 least significant bits (LSBs) of a destination layer-2 ID for groupcast of the first UE and a cast type indicator in the second stage SCI is set to groupcast, starting the sidelink DRX inactivity timer.

5. The method of claim 4, wherein the sidelink DRX inactivity timer is associated with a corresponding destination layer-2 ID for groupcast.

6. A method performed by a second user equipment (UE) in a wireless communication system, the method comprising:
   transmitting, to a first UE, first stage sidelink control information (SCI) on a physical sidelink control channel (PSCCH), the first stage SCI including scheduling information;
   transmitting, to the first UE, second stage SCI on a physical sidelink shared channel (PSSCH) according to the scheduling information; and
   in case that the second stage SCI indicates a new sidelink transmission, starting a sidelink discontinuous reception (DRX) inactivity timer in a first slot after the transmission of the second stage SCI.

7. The method of claim 6, wherein the starting of the sidelink DRX inactivity timer comprises:
   in case that a destination identifier (ID) of the second stage SCI is equal to 16 least significant bits (LSBs) of a destination layer-2 ID for unicast of the second UE, a source ID of the second stage SCI is equal to 8 LSBs of a source layer-2 ID for unicast of the second UE, and a cast type indicator in the second stage SCI is set to unicast, starting the sidelink DRX inactivity timer.

8. The method of claim 7,
   wherein the sidelink DRX inactivity timer is associated with a corresponding source layer-2 ID and destination layer-2 ID pair for unicast.

9. The method of claim 6, wherein the starting of the sidelink DRX inactivity timer comprises:
   in case that a destination identifier (ID) of the second stage SCI is equal to 16 least significant bits (LSBs) of a destination layer-2 ID for groupcast of the second UE and a cast type indicator in the second stage SCI is set to groupcast, starting the sidelink DRX inactivity timer.

10. The method of claim 9, wherein the sidelink DRX inactivity timer is associated with a corresponding destination layer-2 ID for groupcast.

11. A first user equipment (UE) in a wireless communication system, the first UE comprising:
    a transceiver; and
    a controller configured to:
       receive, from a second UE via the transceiver, first stage sidelink control information (SCI) on a physical sidelink control channel (PSCCH), the first stage SCI including scheduling information, receive, from the second UE via the transceiver, second stage SCI on a physical sidelink shared channel (PSSCH) based on the scheduling information, and in case that the second stage SCI indicates a new sidelink transmission, start a sidelink discontinuous reception (DRX) inactivity timer in a first slot after the reception of the second stage SCI.

12. The first UE of claim 11, wherein, to start the sidelink DRX inactivity timer, the controller is further configured to:

in case that a source identifier (ID) of the second stage SCI is equal to 8 least significant bits (LSBs) of a destination layer-2 ID for unicast of the first UE, a destination ID of the second stage SCI is equal to 16 LSBs of a source layer-2 ID for unicast of the first UE, and a cast type indicator in the second stage SCI is set to unicast, start the sidelink DRX inactivity timer.

13. The first UE of claim 12, wherein the sidelink DRX inactivity timer is associated with a corresponding source layer-2 ID and destination layer-2 ID pair for unicast.

14. The first UE of claim 11, wherein, to start the sidelink DRX inactivity timer, the controller is further configured to:

in case that a destination identifier (ID) of the second stage SCI is equal to 16 least significant bits (LSBs) of a destination layer-2 ID for groupcast of the first UE and a cast type indicator in the second stage SCI is set to groupcast, start the sidelink DRX inactivity timer.

15. The first UE of claim 14, wherein the sidelink DRX inactivity timer is associated with a corresponding destination layer-2 ID for groupcast.

16. A second user equipment (UE) in a wireless communication system, the second UE comprising:

a transceiver; and a controller configured to:

transmit, to a first UE via the transceiver, first stage sidelink control information (SCI) on a physical sidelink control channel (PSCCH), the first stage SCI including scheduling information, transmit, to the first UE via the transceiver, second stage SCI on a physical sidelink shared channel (PSSCH) according to the scheduling information, and in case that the second stage SCI indicates a new sidelink transmission, start a sidelink discontinuous reception (DRX) inactivity timer in a first slot after the transmission of the second stage SCI.

17. The second UE of claim 16, wherein, to start the sidelink DRX inactivity timer, the controller is further configured to:

in case that a destination identifier (ID) of the second stage SCI is equal to 16 least significant bits (LSBs) of a destination layer-2 ID for unicast of the second UE, a source ID of the second stage SCI is equal to 8 LSBs of a source layer-2 ID for unicast of the second UE, and a cast type indicator in the second stage SCI is set to unicast, start the sidelink DRX inactivity timer.

18. The second UE of claim 17, wherein the sidelink DRX inactivity timer is associated with a corresponding source layer-2 ID and destination layer-2 ID pair for unicast.

19. The second UE of claim 16, wherein, to start the sidelink DRX inactivity timer, the controller is further configured to:

in case that a destination identifier (ID) of the second stage SCI is equal to 16 least significant bits (LSBs) of a destination layer-2 ID for groupcast of the second UE and a cast type indicator in the second stage SCI is set to groupcast, start the sidelink DRX inactivity timer.

20. The second UE of claim 16, wherein the sidelink DRX inactivity timer is associated with a corresponding destination layer-2 ID for groupcast.

* * * * *